March 8, 1949.  F. GIBADLO  2,463,862
GAS GENERATOR
Filed Oct. 23, 1945
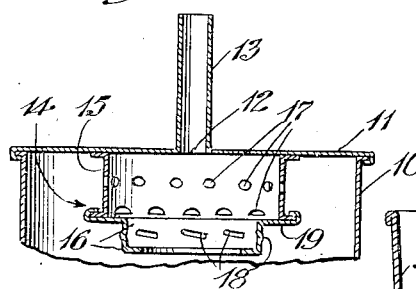
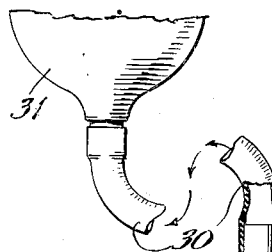
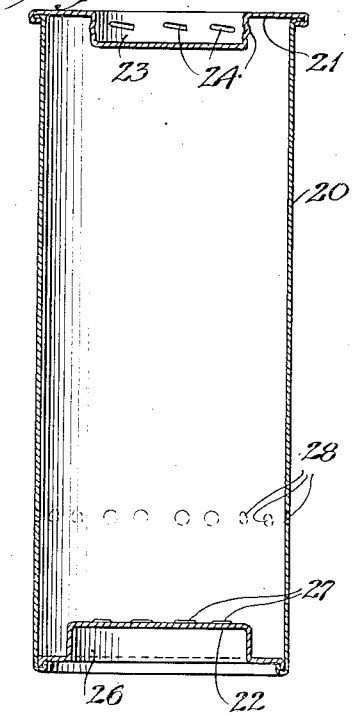
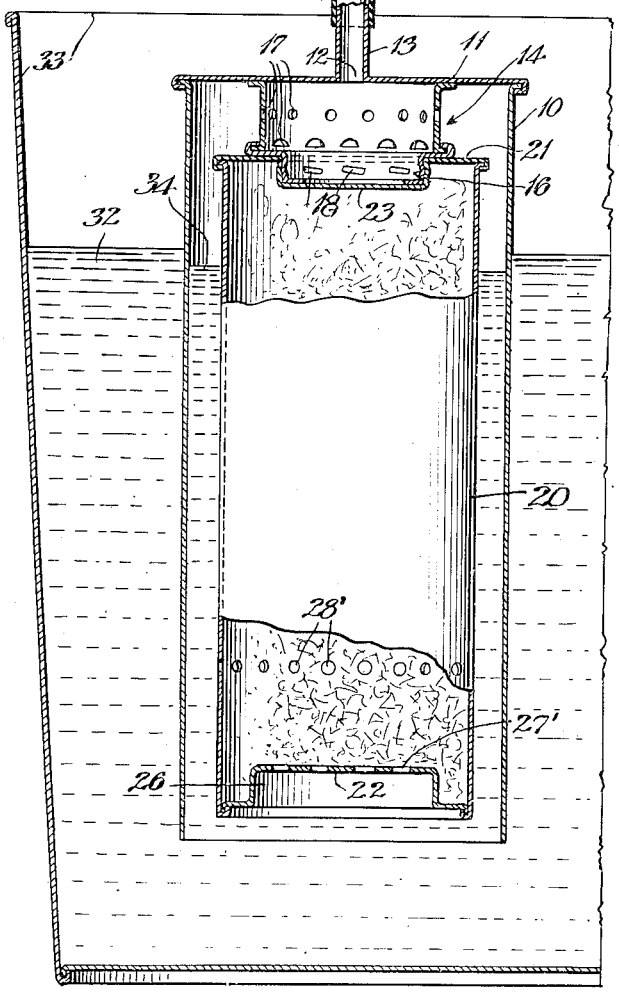
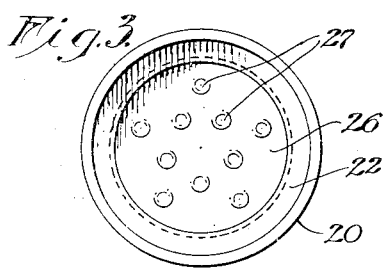
INVENTOR
FRANK GIBADLO
BY
ATTORNEYS Patented Mar. 8, 1949

2,463,862

UNITED STATES PATENT OFFICE 2,463,862

GAS GENERATOR

Frank Gibadlo, Salem, Mass., assignor to Metal Hydrides Incorporated, Beverly, Mass., a corporation of Massachusetts Application October 23, 1945, Serial No. 624,005

16 Claims. (Cl. 23—282)

This invention relates to generators for the production of gas, and has for its object certain improvements in the construction of such generators.

In the production of hydrogen gas on the field, for example, it is customary to react calcium hydride with water as a result of which calcium hydroxide and hydrogen gas are formed. For this purpose, the calcium hydride is usually stored in a sealed can to be used in conjunction with a so-called generator. The generator consists essentially of a large cylindrical casing made of thin sheet iron having an imperforate top provided with a hole communicating with a pipe through which the hydrogen gas may escape. The bottom of the casing is provided with a perforated baffle having a central opening about which a short externally threaded and depending collar is integrally secured. The top of the can is provided with a complementary recessed and threaded portion having scored markings. When hydrogen gas is to be generated, holes are punched in the scored markings and the recessed portion of the can is tightly screwed onto the depending collar of the generator. In another form, the can is stored in the generator and when placed in use, the can is pulled downwardly and outwardly so that it also depends below the generator. In this case, the top of the can is provided with a large central opening covered with tissue openable on contact with water. The generator and can as a unit is then grasped by the operator, who pushes the can part of the unit and a substantial portion of the generator into a body of water, for example a bucket of water. Water then passes upwardly through the perforated baffle and downwardly through the hole or holes in the top of the can, thus bringing the water into reactive contact with the calcium hydride. Hydrogen gas liberated by the reaction rises upwardly through the generator and passes through the hole and pipe at the top. The hydrogen gas may be piped in this manner, for example, into the envelope of a balloon.

Generators of this type have proved objectionable for a number of reasons. In the first type, the can and generator are often separately stored and therefore not readily available when hydrogen gas is to be generated. In both types, when adjusted for operation, the can depends below the generator, thus substantially elongating the unit and making it quite large and unwieldy. Since the reaction of calcium hydride with water is an exothermic one, it causes the released hydrogen gas to be quite hot. Although somewhat cooled by the water, the hydrogen, in turn, heats the casing of the generator, thus making it hot to handle with bare hands. The heated hydrogen gas, moreover, if used to inflate balloons, tends to injure the rubber or other fabric envelope. The hydrogen gas also entrains moisture and carries it into the envelope. Another disadvantage is that the calcium hydroxide formed by the reaction tends to flocculate and collect in the can, thus covering calcium hydride not yet reacted upon and retarding the generation of additional hydrogen gas.

Investigation confirms my discovery that a generator and container may be provided which for the most part overcome disadvantages of the character enumerated. A container of calcium hydride, for example, may be conveniently stored within the generator until it is ready for use, making a simple compact unit. When it is to be used, the container is kept entirely within the generator in its stored position; and the parts are so arranged that the hydrogen gas is bubbled laterally and upwardly through enough water materially to cool the gas so that the generator may be safely held by the operator and the envelope of a balloon will not be injured. Provision may be made to eliminate a good deal of the moisture entrained by the hydrogen before it enters the envelope. In addition, the calcium hydroxide may be easily flushed from the can almost as fast as it forms.

In accordance with the invention, the generator comprises an elongated casing open at its bottom, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, and the lower portion of the collar being provided with means for securing the top of a container thereto.

In a presently preferred practice, the upper portion of the depending collar is perforated with a plurality of relatively small holes so that a plurality of small streams of gas may be passed therethrough. This encourages impingement of the moist gas with the collar so that a substantial amount of its moisture is eliminated before the gas passes through the opening in the top of the generator. A number of the small holes are advantageously placed along the bottom of the upper portion of the depending collar so that they may in addition function as scuppers for the escape of entrained moisture from the interior to the exterior of the collar.

The container in a presently preferred practice of the invention comprises an imperforate casing with an imperforate top and an imperforate bottom, the top being provided with means for securing it to the generator. Scored markings are provided in the lower portion of the container, so that they may be punched to form holes and thus expose the water reactive contents of the container. The top advantageously has a recessed portion into which the lower portion of the depending collar of the generator is adapted to fit, the recessed portion being provided with means for securing it to the collar. The bottom of the container is advantageously provided with scored markings so that when the holes are punched, calcium hydroxide may be flushed therethrough from the interior to the exterior of the container.

These and other features of the invention will be better understood by referring to the accompanying drawing, taken in conjunction with the following description, in which—

Fig. 1 is a fragmentary cross-sectional view of a generator illustrative of a practice of the invention, showing a depending collar integrally secured to the underside of the top of the generator;

Fig. 2 is an elevational view of a container, partly in cross-section, illustrative of a practice of the invention, showing a recessed portion in the top, into which the lower portion of the depending collar may be fitted;

Fig. 3 is a bottom view of the container; and

Fig. 4 is an elevational view, partly in section, showing the container mounted within the generator, the unit being partly submerged in water.

Referring first to Figs. 1 and 4, the generator shown comprises an elongated casing 10 having an imperforate top 11 with a centrally disposed hole 12 over which is integrally mounted a conduit 13. A collar 14, suitably spaced from the wall of the casing, depends from the underside of the top, being integrally attached thereto. The collar is divided into an upper portion 15 and a lower portion 16. The upper portion is provided with a plurality of spaced holes 17 to permit the passage therethrough of gas to and through opening 12 in the top and conduit 13. The lower portion of the collar is provided with a plurality of interrupted threads 18. In a presently preferred practice, the upper and lower portions are separated by an annular ledge portion 19, which is readily obtained by making upper portion 15 somewhat larger in diameter than lower portion 16. Holes 17 are relatively small, a number of them being provided at the base of upper portion 15, adjacent ledge 19, to function as scuppers for the escape of entrained moisture.

Referring next to Fig. 2, the container shown comprises an elongated casing 20 with an imperforate top 21 and an imperforate bottom 22. The top is provided with a recessed portion 23 having a plurality of interrupted threads 24. The recessed portion is slightly larger in diameter than lower portion 16 of the depending collar, so that it may fit into the recessed portion. Interrupted threads 18 and 24 are so spaced as to be complementary, one to the other, thus permitting the container to be tightly screwed onto as well as from the collar, as shown in Fig. 4. As also shown in the latter figure, the side wall of casing 20 of the container is spaced inwardly from the side wall of casing 10 of the generator; and top 21 of the container is spaced from top 11 of the generator. The bottom of the container is also provided with a recessed portion 26, having a plurality of scored markings 27. A plurality of circumferentially spaced and scored markings 28 are also provided in casing 20 near the bottom of the container. The object of these markings is to indicate where holes may be advantageously punched in the container to permit ingress of water and egress of calcium hydroxide, for example, if calcium hydride is the reactant in the container, as well as egress of hydrogen gas.

As shown in Fig. 4, the container is tightly secured to the generator by screwing lower portion 16 of depending collar 14 into recessed portion 23 when interrupted threads 18 and 24 are brought into locking engagement. This permits the container and its contents to be conveniently stored until it is desired to employ the generator-container unit to generate gas. It is also advantageous to make casing 10 of the generator sufficiently long so that the container may be entirely contained within the generator, casing 10 in fact preferably extending somewhat beyond the bottom of the container in its mounted position so that the casing of the generator may function to protect the container from being bumped.

When it is desired to generate hydrogen gas, for example to inflate a balloon, one end of a rubber tubing 30 is advantageously mounted on the free end of conduit 13 and the open end of the envelope 31 of the balloon is fitted tightly (through an intermediate connection, if desired) onto the other end of the rubber tubing. The container is unscrewed from depending collar 14 and withdrawn from the bottom of casing 10. An appropriate tool is used to punch holes 27' and 28' through scored markings 27 and 28. The scored markings have a number of advantages. They indicate precisely where the holes should be punched. They facilitate the punching of holes of predetermined size so as to provide an optimum amount of space primarily for ingress of water and egress of calcium hydroxide through holes 27' and egress of hydrogen gas through holes 28'. After the holes are punched, the container is promptly inserted in the generator and screwed tightly onto depending collar 14. The lower portion of the assembled unit is then pushed into a convenient body of water 32. The water may, for example, be held in a bucket 33. If the generator is used from a life raft, for example, the unit may be submerged in the water in which the raft floats. To facilitate ingress of water and egress of calcium hydroxide through holes 27' and egress of the hydrogen gas through holes 28', the unit may be moved about in the water. As the calcium hydride in the bottom of the container is converted to calcium hydroxide and hydrogen gas, and the calcium hydroxide is flushed out of the container, calcium hydride farther up in the container drops to the bottom to join in the reaction. The container is in effect self-cleaning due to its construction.

In the assembly shown, the hydrogen gas escapes laterally from the container into the space between casings 10 and 20. As a result of the exothermic reaction between the calcium hydride and water, the hydrogen gas is heated. The hot gas then bubbles upwardly in the annular column of water 34 between the casings and is substantially cooled. As the cooled gas rises from the surface of the annular column of water, it continues to move upwardly in the space between the two casings, laterally to and through perforations 17 in depending collar 14, and upwardly through opening 12, conduit 13, rubber tubing 30 into envelope 31 of the balloon. Due to the manner in which upper portion 15 of depending collar 14 is constructed, it acts as a baffle to the passage of the moistened hydrogen gas. As the gas passes through holes 17, a substantial amount of its entrained moisture is eliminated by the collar wall. Such moisture as collects inside the collar is drained through the lower holes, thus permitting drier hydrogen to be passed into the balloon. In general, the smaller the holes, the smaller are the streams of gas flowing into the collar and the more readily will the gas impinge against the wall of the collar, inside and outside, thus causing the moisture in the gas to merge with moisture accumulating on the wall. So far as the passage of gas through the collar is concerned, the holes may be of any size and number sufficient to permit such passage as fast as the gas is generated, to avoid building up any substantial back pressure. The collar as illustrated is somewhat larger in proportion to the other elements than is necessary.

In other words, upper portion 15 and lower portion 16 may be closely coupled so as to conserve space and thereby permit the use of a casing 10 of minimum length. The generator and container may therefore be joined in a unit of maximum compactness.

It will be clear to those skilled in this art that the practice of the invention disclosed readily lends itself to a number of useful modifications. For example, recessed portion 23 may be provided in addition with scored markings similar to those in recessed portion 26; and recessed portion 26 may be provided in addition with interrupted threads, or other suitable securing means, similar to those in recessed portion 23. Such structural features would then adapt the container for use in conventional generators, such as first described above, as well as for the practice more particularly contemplated.

I claim:

1. In a generator for the production of gas, the improvement comprising an elongated casing open at its bottom for the insertion and withdrawal of a container and the entrance of water, an imperforate top integrally secured to the casing, an opening in the top for the escape of gas from the casing, a depending collar integrally secured to the underside of the top around the opening, the side wall of the collar being spaced inwardly from the side wall of the casing, the upper portion of the collar being perforated for the passage of gas therethrough to the opening in the top, and the lower portion of the collar being provided with means for securing the top of a container thereto.

2. In a generator for the production of gas, the improvement comprising an elongated casing open at its bottom for the insertion and withdrawal of a container and the entrance of water, an imperforate top integrally secured to the casing, an opening in the top for the escape of gas from the casing, an external conduit integrally secured to the top at the opening to provide a passageway for the escaping gas, a depending collar integrally secured to the underside of the top around the opening, the wall of the collar being spaced inwardly from the wall of the casing, the upper portion of the collar being perforated for the passage of gas therethrough to the opening in the top, and the lower portion of the collar being provided with means for securing the top of a container thereto.

3. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the upper portion of the collar being provided with a plurality of relatively small spaced holes adapted to act as a baffle in entraining moisture from gas passing through the holes to the opening in the top, and the lower portion of the collar being provided with means for securing the top of a container thereto.

4. In a generator for the production of gas, the improvement comprising an elongated casing open at its bottom, an imperforate top integrally secured to the casing, an opening in the top for the escape of gas from the casing, a depending collar integrally secured to the underside of the top around the opening, the side wall of the collar being spaced inwardly from the side wall of the casing, the upper portion of the collar being provided with a plurality of relatively small spaced holes adapted to act as a baffle in entraining moisture from gas passing through the holes to the opening in the top, some of said holes being located along the bottom of the upper portion to act as scuppers in returning entrained moisture from the interior to the exterior of the collar, and the lower portion of the collar being provided with means for securing the top of a container thereto.

5. In a generator for the production of gas, the improvement comprising an elongated casing open at its bottom, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, and a container secured to the lower portion of the collar, the side wall of the container being spaced from the wall of the casing and the top of the container being spaced from the top of the generator so that gas may pass freely through the space thus provided to and through the perforated upper portion of the collar.

6. In a generator for the production of gas, the improvement comprising an elongated casing open at its bottom, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, and a container secured to the lower portion of the collar, the side wall of the container being spaced from the wall of the generator and the top of the container being spaced from the top of the generator so that gas may pass freely through the space thus provided to and through the perforated upper portion of the collar, said container being provided with scored markings in its lower portion so that they may be punched to form holes and thus expose the contents of the container.

7. In a generator for the production of gas, the improvement comprising an elongated casing open at its bottom, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, and a container secured to the lower portion of the collar, the side wall of the container being spaced from the wall of the casing and the top of the container being spaced from the top of the casing so that gas may pass freely through the space thus provided to and through the perforated upper portion of the collar, said container being contained entirely in the casing so that the bottom of the container does not extend outwardly beyond the bottom of the casing.

8. In a generator for the production of gas, the improvement comprising an elongated casing open at its bottom for the insertion and withdrawal of a container and the entrance of water, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, a container secured to the lower portion of the collar, the container comprising an imperforate casing with an imperforate top and an imperforate bottom, the side wall of the container casing being spaced from the side wall of the generator casing and the top of the container being spaced from the top of the generator so that gas may pass freely through the space thus provided to and through the perforated upper portion of the collar, the top of the container having a recessed portion into which the lower portion of the depending collar fits, the recessed portion being provided with securing means of the lower portion of the collar, and scored markings in the lower portion of the container so that they may be readily punched to form holes and thus expose the contents of the container.

9. In a generator for the production of gas, the improvement comprising an elongated casing open at its bottom for the insertion and withdrawal of a container and the entrance of water, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, a container secured to the lower portion of the collar, the container comprising an imperforate casing with an imperforate top and an imperforate bottom, the side wall of the container casing being spaced from the side wall of the generator casing and the top of the container being spaced from the top of the generator so that gas may pass freely through the space thus provided to and through the perforated upper portion of the collar, the top of the container being provided with securing means in locking engagement with the securing means of the lower portion of the collar, the bottom of the container having a recessed portion, and scored markings in the recessed portion so that they may be readily punched to form holes and thus expose the contents of the container.

10. In a generator for the production of gas, the improvement comprising an elongated casing open at its bottom for the insertion and withdrawal of a container and the entrance of water, an imperforate top integrally secured to the casing, an opening in the top for the escape of gas from the casing, a depending collar integrally secured to the underside of the top around the opening, the side wall of the collar being spaced inwardly from the wall of the casing, the upper portion of the collar being perforated for the passage of gas therethrough to the opening in the top, the lower portion of the collar being provided with means for securing the top of a container thereto, a container secured to the lower portion of the collar, the container comprising an imperforate casing with an imperforate top and an imperforate bottom, the side wall of the container casing being spaced from the side wall of the generator casing and the top of the container being spaced from the top of the generator so that gas may pass freely through the space thus provided to and through the perforated upper portion of the collar, the top of the container being provided with securing means in locking engagement with the securing means of the lower portion of the collar, the bottom of the container having a recessed portion, scored markings in the side wall of the container casing and scored markings in the recessed portion so that they may be readily punched to form holes and thus expose the contents of the container.

11. In a generator for the production of gas, the improvement comprising an elongated casing open at its bottom for the insertion and withdrawal of a container and the entrance of water, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, a container secured to the lower portion of the collar, the container comprising an imperforate casing with an imperforate top and an imperforate bottom, the side wall of the container casing being spaced from the side wall of the generator casing and the top of the container being spaced from the top of the generator so that gas may pass freely through the space thus provided to and through the perforated upper portion of the collar, the top of the container having a recessed portion into which the lower portion of the depending collar fits, the recessed portion in the top of the container being provided with securing means in locking engagement with the securing means of the lower portion of the depending collar, the bottom of the container having a recessed portion, and scored markings in the recessed portion of the bottom so that they may be readily punched to form holes and thus expose the contents of the container.

12. In a generator for the production of gas, the improvement comprising an elongated casing open at its bottom for the insertion and withdrawal of a container and the entrance of water, an imperforate top integrally secured to the casing, an opening in the top for the escape of gas from the casing, a depending collar integrally secured to the underside of the top around the opening, the wall of the collar being spaced inwardly from the wall of the casing, the upper portion of the collar being perforated for the passage of gas therethrough to the opening in the top, the lower portion of the collar being provided with means for securing the top of a container thereto, a container secured to the lower portion of the collar, the container comprising an imperforate casing with an imperforate top and an imperforate bottom, the side wall of the container casing being spaced from the side wall of the generator casing and the top of the container being spaced from the top of the generator so that gas may pass freely through the space thus provided to and through the perforated upper portion of the collar, the top of the container having a recessed portion into which the lower portion of the depending collar fits, the recessed portion in the top of the container being provided with securing means in locking engagement with the securing means of the lower portion of the depending collar, the bottom of the container having a recessed portion, scored markings in the side wall of the container casing and scored markings in the recessed portion of the bottom of the container so that they may be readily punched to form holes and thus expose the contents of the container.

13. In a container for use in a generator for the production of gas, the improvement comprising an imperforate casing with an imperforate top and an imperforate bottom, the top being provided with means for securing the same to a generator, and scored markings in the lower portion of the container so that they may be punched to form holes and thus expose the contents of the container.

14. In a container for use in a generator for the production of gas, the improvement comprising an imperforate casing with an imperforate top and an imperforate bottom, the top having a recessed portion into which a depending collar portion of the generator is adapted to fit, the recessed portion being provided with means for securing the same to the depending collar portion, and scored markings in the lower portion of the container so that they may be punched to form holes and thus expose the contents of the container.

15. In a container for use in a generator for the production of gas, the improvement comprising an imperforate casing with an imperforate top and an imperforate bottom, the top being provided with means for securing the same to a generator, the bottom having a recessed portion, and scored markings in the recessed portion so that they may be punched to form holes and thus expose the contents of the container.

16. In a container for use in a generator for the production of gas, the improvement comprising an imperforate casing with an imperforate top and an imperforate bottom, the top being provided with means for securing the same to a generator, the bottom having a recessed portion, scored markings in the side wall of the casing and scored markings in the recessed portion so that they may be punched to form holes and thus expose the contents of the container.

FRANK GIBADLO.

REFERENCES CITED

The following references are of record in the file of this patent:

UNITED STATES PATENTS

| Number | Name | Date |
| --- | --- | --- |
| 1,684,979 | Valentour | Sept. 18, 1928 |
| 2,211,430 | Ness | Aug. 13, 1940 |

FOREIGN PATENTS

| Number | Country | Date |
| --- | --- | --- |
| 718 | Austria | Dec. 27, 1899 |